Nov. 5, 1968   G. C. WALLACE ET AL   3,409,134
FILTRATION PROCESS WITH SCRAPING AND BLOW-BACK CAKE REMOVAL
Filed Oct. 22, 1965   2 Sheets-Sheet 1
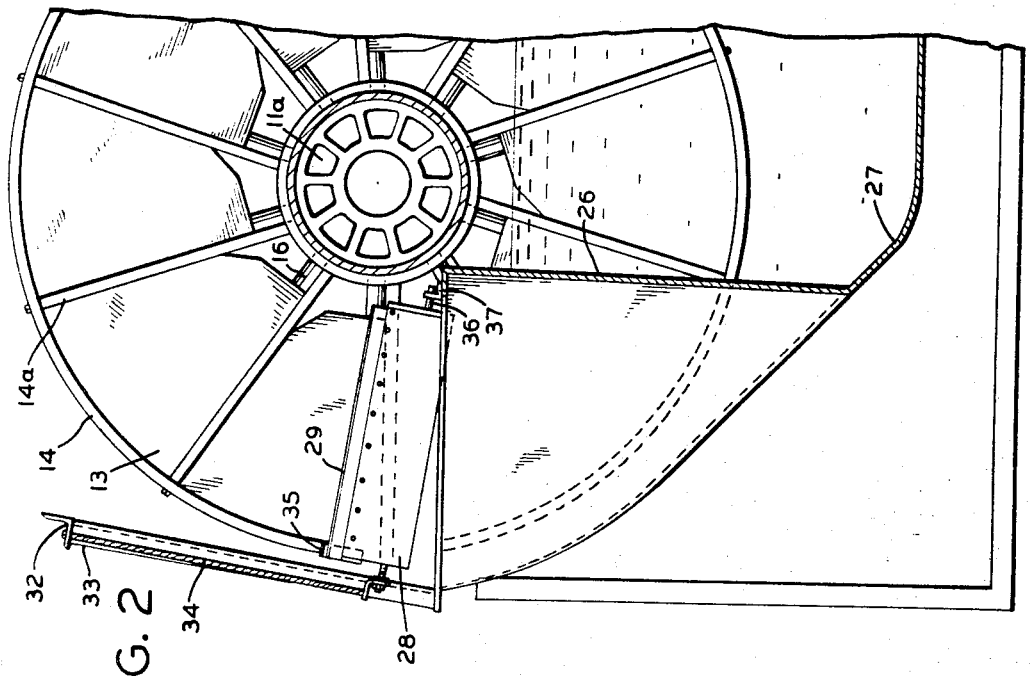
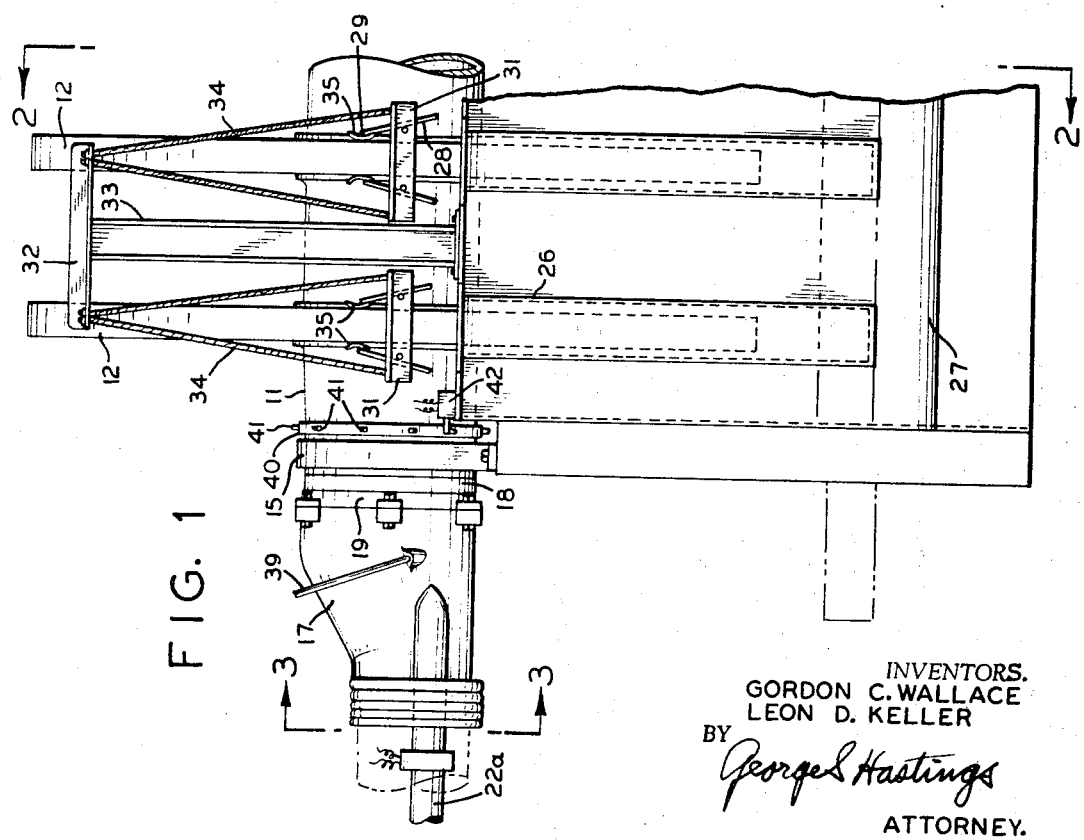
INVENTORS.
GORDON C. WALLACE
LEON D. KELLER
BY *George S. Hastings*
ATTORNEY.

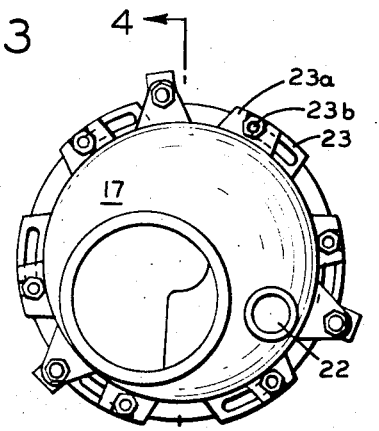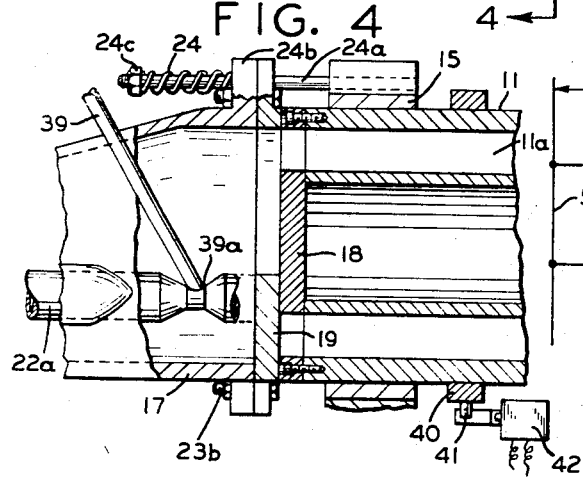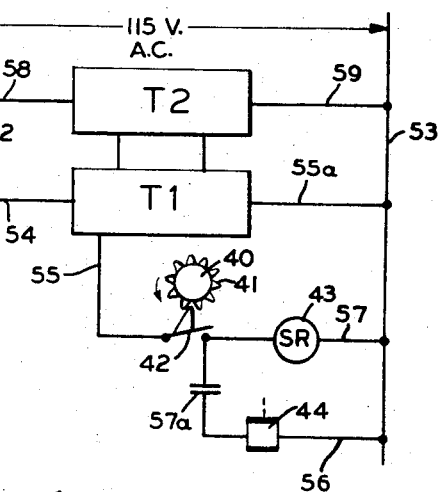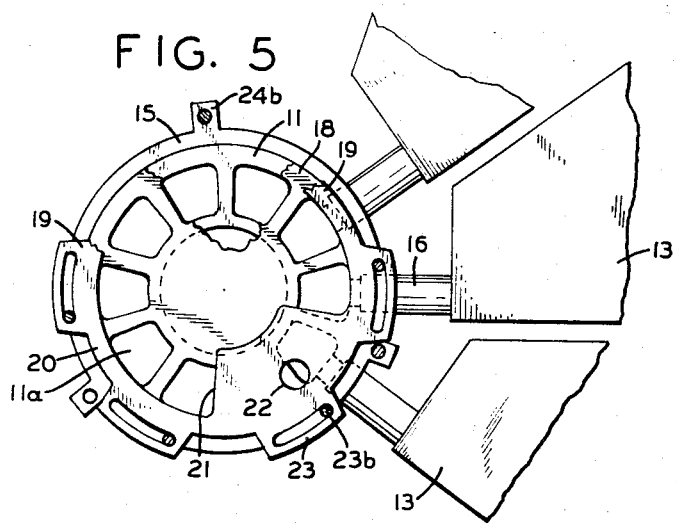

United States Patent Office 3,409,134
Patented Nov. 5, 1968

3,409,134
FILTRATION PROCESS WITH SCRAPING AND BLOW-BACK CAKE REMOVAL
Gordon C. Wallace, Westport, Conn., and Leon D. Keller, Virginia, Minn., assignors to Dorr-Oliver Incorporated, Stamford, Conn., a corporation of Delaware
Filed Oct. 22, 1965, Ser. No. 500,605
10 Claims. (Cl. 210—77)

This invention relates to filters and a method of filtering and more particularly relates to the operation of disc filters of the general type disclosed in the U.S. patent to Salisbury No. 1,259,139, May 12, 1918, in which a plurality of spaced discs are mounted on a hollow trunnion shaft for rotation thereon.

Filters of this type are provided with scrapers generally similar to that disclosed in the U.S. patent to Morehouse et al. No. 2,974,802 for scraping the filter cake off the discs and delivering the cake in a different trough from that which holds the slurry to be filtered. Such devices have commonly been designed to scrape off all of the loosened cake after cut-off of suction and blowback.

We have found that by modifying this type of filter and by operating it in accordance with the invention, drier cake and increased capacity can be obtained. The invention is particularly useful in the filtering and processing of slurries of particulate matter such as crushed mineral ore as, for example, taconite iron ore found at the Mesabi iron range.

We have found that such filters can be operated to pick up a layer of an inch or more of taconite or like material and that in such layers much of the moisture is in the $\frac{1}{16}$ to $\frac{1}{8}$ inch layer nearest the filter surface and that by scraping off the rest of the filter cake and leaving the wet layer adjacent the filter surface of the filter, we can produce a cake which is much drier than hitherto was possible, producing large savings in the cost of subsequent operations such as roasting the ore cake, or pelletizing the same.

We have also found that it is unnecessary to remove the thin wet undercoat left after scraping after every revolution of the disc sectors. By skipping blow and discharge of cake from the sectors for a number of revolutions or a predetermined period of time the lost time during blow and discharge, and the time required to build up the lower or wet stratum of filter cake is saved rendering the whole operation more efficient. In addition, wear and tear on the filter medium is decreased.

Special scraping means designed to accurately follow the contours of the disc are provided in order to assure a layer of material of uniform thickness on the discs after scraping.

In the drawings:

FIGURE 1 is a side elevation edgewise of the discs showing a partial view of the trunnion shaft and the scrapers.

FIGURE 2 is an end view on line 2–2 of FIG. 1.

FIGURE 3 is an end view on line 3–3 of FIG. 1.

FIGURE 4 is a longitudinal sectional view on line 4–4 of FIGURE 3.

FIGURE 5 is a partial end view with the valve removed to show the bridge plate with part of the bridge plate broken away to show the channels in the trunnion shaft and the connection of the disc sector stems thereto.

FIGURE 6 is a circuit diagram illustrating the cake discharge blow timing control.

Referring now to the drawings, there is illustrated in FIGS. 1 and 2 a partial view of a rotary disc type filter comprising a hollow trunnion shaft 11 on which are mounted discs 12 each consisting of ten identical liquid permeable filter sectors 13 arranged about the shaft and secured together by a rim 14 and radial clamping rods 14a. The hollow trunnion shaft is mounted for rotation in bearings 15 and rotated by any suitable drive means as shown in said U.S. Patent No. 1,259,139.

The hollow trunnion shaft 11 (FIG. 2) is divided into a series of ten similar longitudinal channels 11a spaced equally about the axis of the shaft, one for each sector angle. The filter sectors 13 on each disc are arranged in axial alignment with those on the other discs so as to form 10 rows of axially aligned sectors, all the discs of one row communicating with one channel through sector stems 16.

As shown in FIGS. 4 and 5 a stationary hollow valve body 17 connected to a suitable source of vacuum for filtration leads to the channels of the trunnion shaft. Secured to the face of the trunnion and rotating therewith is a wear plate 18 having ten openings each registering with one of the ten channels in the trunnion shaft.

A stationary bridge plate 19 between the valve body and the wear plate co-acts with the openings in the wear plate to successively shield and open channels leading to the disc filters to control suction and blow air through the sectors. For this purpose, the bridge plate 19 is mounted on the valve body for an angular adjustment to permit adjusting the starting and stopping times of suction and blow through the respective channels 11a and sectors 13. This bridge plate (see FIG. 5) is an open center member having a rim 20 which fits in liquid-tight engagement between the valve body and the wear plate having inwardly an annularly extending shield portion 21 for closing off, during part of the revolution of the discs, the vacuum openings in the wear plate leading to channels and for opening the channels to blow hole 22 in the bridge plate when blowing is required. The bridge plate is provided with slotted projections 23 and the valve body is provided with radially slotted lugs 23a by which the bridge plate and the valve may be adjustably clamped by conventional clamp screws 23b into any relative angular position with an adjustment of approximately 21°. The valve parts are kept in tight spring pressed engagement by spring 24, which surrounds stem 24a secured to bearing 15, and which is pressed against valve body lug 24b by nut 24c.

To discharge the coat left after scraping a suitable source of compressed blow air is connected to the blow hole in the annular shield portion of the bridge plate through conduit 22a which passes through the valve body 17. The opposite end of the valve body is connected to a suitable source of vacuum through which liquid is drawn from filter sectors to dry the filter cake thereon.

Thus, as the hollow trunnion 11 rotates the openings in the wear plate register successively with the open center portion of the wear plate and the closure portion or bridge area of the bridge plate and thus suction is successively cut on and off and blows given to each axial row of sectors through the channels in the trunnion, thus picking up a thick layer of cake and later discharging the thin wet layer of cake remaining after scraping. As hereinafter described, the blows may be timed to occur in a certain sequence during a plurality of revolutions of the discs and a predetermined time interval may be established between blow sequences.

The discs 12 rotate in compartment 26 of tank 27 which is filled with the taconite or other slurry of particulate material to be filtered. It has been found possible to operate these discs at such a rate that they will pick up as much as an inch or more in thickness of taconite cake or like material on each surface of the disc. Scrapers 28 having hardened edges 29 are secured on either side of the disc with the edges spaced a desired distance, generally such that there is $\frac{1}{8}$ and $\frac{1}{16}$ of an inch between each edge and the disc surface. The blades after suitable adjustment are mounted a fixed distance apart on blade carriers 31 hung on a crossbar 32 mounted on an upright 33 by means of flexible cables 34. Shoes 35 at the outer or circumferential end of the blades ride on the rim 14 on either side thereof and thus maintain the blades at a fixed and uniform distance from the surface of the filter sectors. Each blade has secured to its inner or axial end a pintle 36 pivoted in a pivot bearing 37.

The thickness of the slurry may vary considerably but in order to increase the thickness of the layer picked up by the vacuum filter and to decrease the pick-up time required we have found it desirable to supply a thick slurry in the range of 50% to 80% solids, approximately 70% being found satisfactory for efficient operation.

While the filter and method herein described can operate on particle sizes of ore or mineral matter, which vary widely, the ore or mineral is generally quite finly divided. For example, one of the taconite ores filtered was such that 70% to 90% of the ore particles by weight were capable of passing through a 325 mesh screen.

To provide a timed blow, the blow conduit 22a leads through the valve body to the blow hole 22 in the bridge plate. Blow air from a source of compressed blow air enters conduit 22a and passes through solenoid valve 42, designed to open only when current is applied to the solenoid, and thence to blow hole 22.

Filter operation

Filter discs 12 are driven at such a rate through the pool of thick slurry in tank 27 and compartment 16 that they pick up approximately 1 inch of taconite layer on each surface. The knives 28 are set so that their edges are approximately 1/16 to 1/8 of an inch from the surface of the filters in order to leave the more moist strata of the cake on the filter. By so doing and removing only the dried portion of the cake which may be 3/4 of an inch thick or more, it is possible to get cake having a moisture content of 9% or 10% or below which is a desirable percentage range for pelletizing ore. The remaining moist heel layer of 1/16 to 1/8 of an inch of taconite cake on the filter cloth is discharged by a wet continuous blow through blow pipe 22a and blow hole 22. This blow is preferably made of a soft wet blow continuing while blow hole 22 registers with a channel. Water atomized through atomizer 39 feeds a fine mist of moisture into the blow. The blow is preferably made just after immersion in the pool of slurry in tank 27 and just before pickup of cake starts thus agitating the slurry in the tank. By adjusting the bridge plate with respect to the valve body, the timing of blow and discharge with respect to immersion can be accurately controlled.

Efficiency can be considerably increased by skipping the blow for a plurality of revolutions, or for a considerably longer time up to half an hour or more depending on conditions thus using the entire time of passage through the tank for pick-up under vacuum and continuously scraping the cake on the disc sectors without discharging the wet 1/16 to 1/8 of an inch thick heel layer. The number of revolutions or amount of time before blow and discharge of the wet heel layer will be determined by the time it takes to blind the passage of liquid of the heel layer.

Blow operation and timing

It is desirable that each blowing of the ten filter sectors be distributed in spaced sequence over more than one revolution to avoid overloading the pool in the tank with discharged cake. It is also desirable that as much time pass between blowing sequences as freedom from binding of the wet layer of cake on the sectors permits, since each blowing takes time out from filtering during discharge and pick-up of a new layer.

Electrical timing means are provided for the above purpose as illustrated in FIG. 6. A ring 40 rotating with trunnion shaft 11, carries a cam 41 having thereon ten equally spaced cam projections 41a which successively engage limit switch 42 in time with the position of the channels 11a and rows of sectors connected thereto. If the circuit through the limit switch is otherwise closed this will actuate the normally closed solenoid valve 42 and cause a blow through the channel 11a which registers with the blow hole in the bridge plate which would normally be that communicating with the row of sectors which has just entered the pool of slurry.

Whether a blow occurs when the limit switch is closed depends on the control circuit and joint operation of the conventional on and off timers T1 and T2. Timer T1 controls the on time of the blow sequence and is supplied with current from power lines 52 and 53 through leads 54 and 55 through the limit switch 42, the stepping switch contact 57a and thence through solenoid 44 and lead 56 to power line 53. The stepping switch derives its power supply for stepping through lead 57 to the stepping switch.

In operation, assuming on timer 2 is set at on condition, the ten cam projections 41 successively close limit switch 42. This causes stepping switch 43 to count once for each contact by the limit switch. The stepping switch after three contacts closes steppings switch contact 57a actuating solenoid valve 44 causing a blow back through conduit 22a and channel 11a discharging the thin wet layer or heel from one row of filter sectors into the slurry pool. This blow lasts only as long as the limit switch is closed and hence its length is controlled by the annular length of the cam projection. As illustrated, the on timer is set for the time required for 3 1/3 revolutions during which all ten sector rows will have discharged the layer or heel left after scraping, whereupon the on timer will open the circuit through the limit switch and set the off timer T2 into operation in off condition. The off timer T2 maintains the circuit through the limit switch open for a preset period of time which may be a few minutes to an hour or more depending on material and filtering conditions after which the off timer resets the on timer to on condition and the cycle starts again. A suitable timer T1 for this purpose is Eagle Signal Corp. Reset timer "Cycl-Flex," Catalogue No. HP53A6, with a 5-minute dial setting and a minimum setting of 9 seconds. A suitable timer T2 for this purpose is Eagle Signal Corp. Reset timer "Cycl-Flex" Catalogue HP55A6 with a 30-minute dial and a minimum setting of 60 seconds. These are obtainable in one enclosure interconnected to operate as above set forth. A suitable stepping switch 43 for operating contact 52 is Eagle Signal Corp. "MT" Series Step Switch, Catalogue MT02A612.

Thus by varying the time intervals in the operation the Off-Timer and the On-Timer the discharge sequence of the wet layer of cake can be postponed for any desired period of time depending on how long it takes that layer to blind under the current operating conditions.

While the invention has been described with particular reference to rotary disc filters it is understood that the invention may be adapted for use in association with other types of rotary filters.

What we claim is:

1. The method of continuously filtering an aqueous slurry of finely divided mineral particles by means of a filter having a tank holding a pool of slurry and a rotating filter having circularly arranged hollow filter sections, the lower portion of which filter passes through said pool and has vacuum and blow means operatively connected to said sections, which comprises the steps of continuously rotating said filter through said tank under suction to apply 1/2 to 1 1/2 inches of filter cake on said filter sections of which there is a comparatively wet layer next to the surface of the section and a comparatively dry layer above said wet layer, scraping off all except 1/16–1/4 inch of the filter cake while maintaining suction thereon and thereafter blowing and separately discharging the wet layer, whereby the scraped material constitutes a filter cake of increased dryness.

2. The invention according to claim 1 in which the rotation of each section and the scraping off of said dry layer from each section is continued for a plurality of revolutions before blowing and discharging said wet layer from the section.

3. The invention according to claim 1 in which the rotation of each section and the scraping off of said dry layer from such section is continued for a plurality of revolutions before blowing and discharging said wet layer from the section, and in which only a part of the sections are blown to discharge the wet layer at any one time.

4. The invention according to claim 1, in which the wet layer is discharged into the pool of slurry.

5. The invention according to claim 1 in which blowing occurs in each section when the section is submerged in said pool, thereby agitating the pool.

6. The invention according to claim 1 in which a fine mist of water is fed into the blow.

7. The invention according to claim 1, in which said aqueous slurry is supplied at a solids content of between 50% and 80%.

8. The method of continuously filtering an aqueous slurry finely divided taconite ore particles by means of a filter having a tank holding a pool of taconite slurry and a hollow rotating filter the lower portion of which passes through said pool and having vacuum and blow means connected to said hollow filter, which comprises the steps of continuously rotating said filter through said tank under suction to apply ½ to 1½ inches of taconite filter cake on said filter of which there is a comparatively wet layer next to the surface of the filter and a comparatively dry layer above the wet layer, scraping off all except $1/16$–¼ inch of the filter cake formed from said slurry to remove the dry layer while maintaining suction thereon and thereafter blowing and discharging the wet layer, whereby taconite ore filter cake of increased dryness is produced.

9. The method of continuously filtering taconite slurry by means of a rotary disc filter of the type having a series of hollow radially extending vacuum filter discs and having a source of vacuum communicating with the discs, and a source of blow air also communicating with said discs, which comprises the steps of (a) continuously rotating said discs through a pool of the taconite slurry, (b) applying suction on said discs while passing through said pool to pick up a thick layer of taconite on the order of at least three quarters of an inch thick, of which after filter there is a comparatively wet layer next to the filter surface less than one quarter of the layer in thickness and a comparatively dry layer away from the filter surface more than three quarters of the layer in thickness, (c) scraping off said dry layer while maintaining suction thereon, and leaving the wet layer on the discs, (d) continuing the rotation of said discs through said pool and scraping off of said dry layer for a plurality of revolutions of the disc without removing the wet layer and thereafter blowing the wet layer only after said plurality of revolutions to return the same to the pool, whereby the scrapings constitute taconite filter cake of increased dryness.

10. The invention according to claim 9, in which said discs each consist of a plurality of hollow sectors arranged around the axis of the disc and in which blowing takes place in each sector when the sector is submerged in said pool.

References Cited
UNITED STATES PATENTS

| | | | |
|---|---|---|---|
| 2,083,887 | 6/1937 | Wieneke | 210—396 X |
| 2,839,194 | 6/1958 | Lopker et al. | 210—393 X |
| 2,974,802 | 3/1961 | Morehouse et al. | 210—306 |

SAMIH N. ZAHARNA, *Primary Examiner.*